(12) United States Patent
Dunker et al.

(10) Patent No.: US 10,110,970 B2
(45) Date of Patent: *Oct. 23, 2018

(54) INSERTING ADVERTISEMENTS INTO VIDEO CONTENT

(71) Applicant: Gracenote, Inc., Emeryville, CA (US)

(72) Inventors: Peter Dunker, Berkeley, CA (US); Markus K. Cremer, Orinda, CA (US); Donald F. Gordon, Mountain View, CA (US)

(73) Assignee: Gracenote, Inc., Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/700,054

(22) Filed: Sep. 8, 2017

(65) Prior Publication Data

US 2018/0020265 A1    Jan. 18, 2018

Related U.S. Application Data

(63) Continuation of application No. 13/826,282, filed on Mar. 14, 2013, now Pat. No. 9,794,642.

(Continued)

(51) Int. Cl.
*H04N 21/81* (2011.01)
*H04N 21/234* (2011.01)
(Continued)

(52) U.S. Cl.
CPC ..... *H04N 21/812* (2013.01); *H04N 21/23424* (2013.01); *H04N 21/2668* (2013.01);
(Continued)

(58) Field of Classification Search
CPC ................ H04N 21/812; H04N 7/165; H04N 21/23424; H04N 21/2668
See application file for complete search history.

(56) References Cited

U.S. PATENT DOCUMENTS 6,698,020 B1    2/2004  Zigmond et al.
8,079,054 B1   12/2011  Dhawan et al.
(Continued)

OTHER PUBLICATIONS

"Gen2(TM)", Advanced Advertising Video Platform for Automatically Inserting Local Video Programs Into Remotely Programmed TV Content Without the Use of Network Cue-Tone Signals. Integrates MPEG-2 Splicing and Video Identification Algorithms Into a Single System, (2010), 2 pages.

(Continued)

*Primary Examiner* — Sumaiya A Chowdhury
(74) *Attorney, Agent, or Firm* — McDonnell Boehnen Hulbert & Berghoff LLP

(57) ABSTRACT

Methods and systems to insert advertisements and/or other supplemental or replacement content into a stream of video content are described. In some example embodiments, the methods and systems receive a request to replace a portion of video content currently playing at a client device with supplemental video content, such as an advertisement. In response to the request, the methods and systems determine one or more fingerprints of the video content plating at the client device, identify one or more frames of the video content at which to insert the supplemental video content based on the one or more fingerprints, and insert the supplemental video content at the identified one or more frames of the video content.

20 Claims, 6 Drawing Sheets

Related U.S. Application Data

(60) Provisional application No. 61/749,518, filed on Jan. 7, 2013.

(51) Int. Cl.
 *H04N 21/2668* (2011.01)
 *H04N 21/845* (2011.01)
 *H04N 21/8352* (2011.01)
 *H04N 21/658* (2011.01)

(52) U.S. Cl.
 CPC ..... *H04N 21/6581* (2013.01); *H04N 21/8352* (2013.01); *H04N 21/8455* (2013.01)

(56) References Cited

U.S. PATENT DOCUMENTS

| | | | |
|---|---|---|---|
| 2003/0001977 A1* | 1/2003 | Wang | H04N 5/76 348/700 |
| 2004/0031047 A1 | 2/2004 | Legallais et al. | |
| 2007/0074243 A1 | 3/2007 | Verhaegh et al. | |
| 2009/0106785 A1 | 4/2009 | Pham | |
| 2010/0158358 A1 | 6/2010 | Lienhart et al. | |
| 2013/0024888 A1* | 1/2013 | Sivertsen | H04N 21/4312 725/32 |
| 2013/0031582 A1 | 1/2013 | Tinsman et al. | |

OTHER PUBLICATIONS

"Identifying Media Across the Entire Media Asset Lifecycle", iPharro Media, (2010), 3 pages.

"TV Advertising Tutorial—Ad Insertion—Ad Splicing", [Online]. Retrieved from the Internet: <URL: http://www.althos.com/tutorial/TV-advertising-tutorial-ad-splicing.html, (Accessed Jun. 10, 2015), 2 pages.

Atkinson, Richard, "Fingerpriting & Watermarking Whatt, When, How?", (Sep. 22, 2011), 28 pages.

Rosenblatt, Bill, "Content Identification Technologies Business Benefits for Contetn Owners", Giat Steps Media Technology Strategies, (Apr. 15, 2008), 27 pages.

* cited by examiner

INSERTING ADVERTISEMENTS INTO VIDEO CONTENT

CROSS REFERENCE TO RELATED APPLICATIONS

This application is a continuation of U.S. patent application Ser. No. 13/826,282, filed Mar. 14, 2013, which claims priority to U.S. Provisional Patent Application No. 61/749,518, filed on Jan. 7, 2013, entitled INSERTING ADVERTISEMENTS INTO VIDEO CONTENT, which are hereby incorporated by reference in their entirety.

TECHNICAL FIELD

The subject matter disclosed herein generally relates to the processing of data. Specifically, the present disclosure addresses systems and methods to insert advertisements into video content.

BACKGROUND

Typically, people watch video content, such as television shows, advertisements, movies, video clips, and so on, via devices that receive a transmission from a content source. For example, a content distributor (e.g., a cable, Internet, or satellite system) receives content from a broadcaster or content provider (e.g., HBO® or CNN®), a web server (e.g., YouTube®), a peer-to-peer source (e.g., another device), and so on, and streams or otherwise transmits video content to various devices capable of presenting the video content, such as televisions and associated set-top boxes, computing and/or mobile devices and associated media players or browsers, and so on.

BRIEF DESCRIPTION OF THE DRAWINGS

Some embodiments are illustrated by way of example and not limitation in the figures of the accompanying drawings.

DETAILED DESCRIPTION

Overview

Example methods and systems for inserting advertisements and/or other supplemental or alternative content into a stream of video content are described. In some example embodiments, the methods and systems receive a request to replace a portion of video content currently playing at a client device with supplemental video content, such as an advertisement. In response to the request, the methods and systems determine one or more fingerprints of the video content playing at the client device, identify one or more frames of the video content at which to insert the supplemental video content based on the one or more fingerprints, and insert the supplemental video content at the selected one or more frames of the video content.

For example, the methods and systems may identify within fingerprints a frame of video content that is associated with a transition (e.g., a black screen) between a first portion of content within the video content and a second portion of content within the video content, and insert an advertisement at or proximate to the identified frame of video content.

The example methods and systems may, therefore, enable content distributors and/or broadcasters to dynamically modify the advertisements and other content their subscribers view during live broadcasts, because they facilitate the seamless insertion and/or replacement of played content, among other things.

In the following description, for purposes of explanation, numerous specific details are set forth to provide a thorough understanding of example embodiments. It will be evident to one skilled in the art, however, that the present subject matter may be practiced without these specific details.

Example Network Environment

Figure 1:
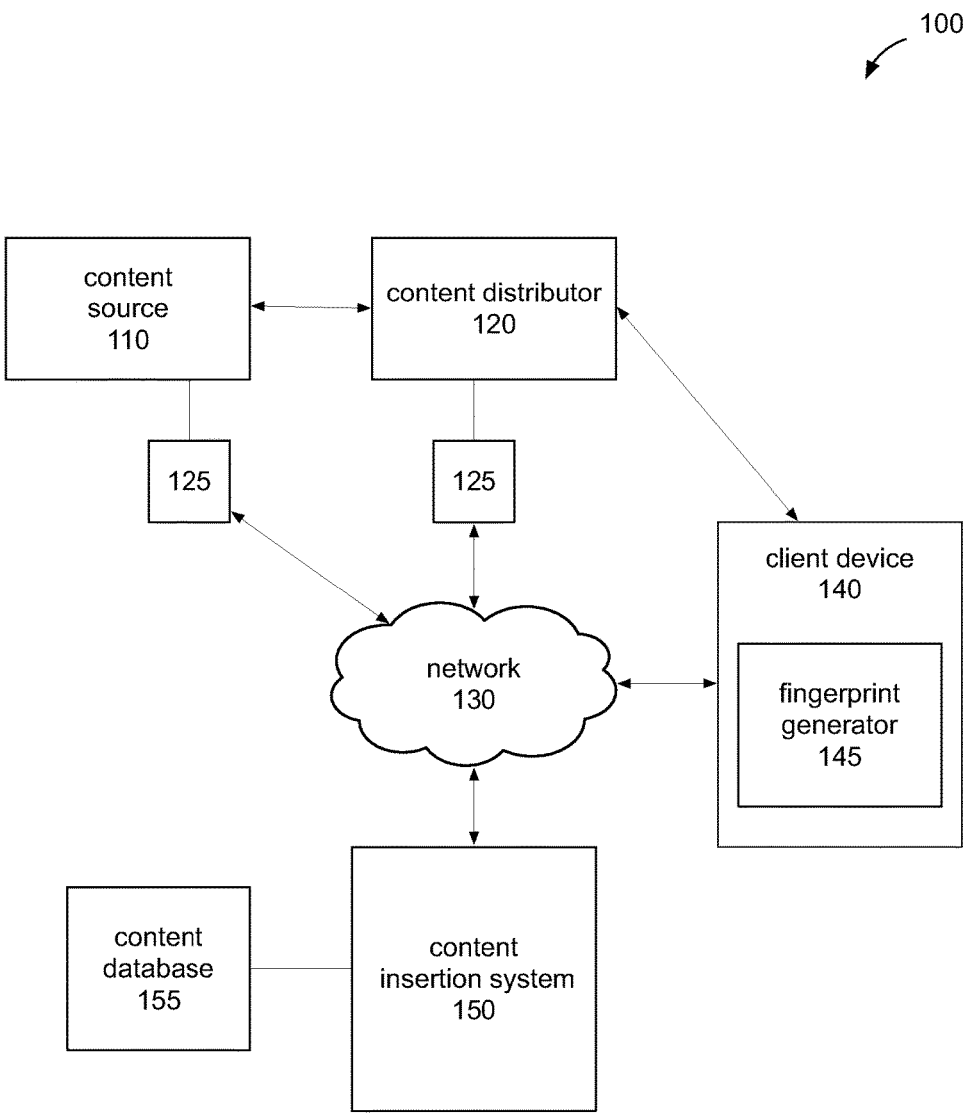
FIG. 1 is a network diagram illustrating a network environment suitable for inserting advertisements into video content, according to some example embodiments.

FIG. 1 is a network diagram illustrating a network environment 100 suitable for inserting advertisements into video content, according to some example embodiments.

The network environment 100 may include a content source 110 (e.g., a broadcaster, network, a website, and so on), that provides multimedia content, such as video content, to one or more distributors, such as a content distributor 120 (e.g., a multichannel distributor). Example distributors may include cable television systems, direct broadcast satellite systems, wireline video providers, over-the-top (OTT) providers, and so on.

One or more client devices 140 may receive the video content that originates from the content source 110 via the content distributor 120. For example, the client device 140 may receive content from the content distributor 120 via a broadcast channel (e.g, a cable channel or satellite connection) and/or over the network 130, such as the Internet. The network 130 may be any network that enables communication between devices and/or distributors, such as a wired network, a wireless network (e.g., a mobile network), and so on. The network 130 may include one or more portions that constitute a private network (e.g., a cable television network or a satellite television network), a public network (e.g., over-the-air broadcast channels or the Internet), and so on.

The client device 140 may include televisions, set-top boxes, laptops and other personal computers, tablets and other mobile devices, gaming devices, and other devices capable of receiving and presenting a stream of video and/or other multimedia content. In some example embodiments, the client device 140 may include a tuner configured to receive a stream of video content and play the stream of video content by processing the stream and outputting information (e.g., digital or analog) usable by a display of the client device 140 to present the video content to a user associated with the client device 140. The client device 140 may also include a display or other user interface configured to display the processed stream of video content. The display may be a flat-panel screen, a plasma screen, a light emitting diode (LED) screen, a cathode ray tube (CRT), a liquid crystal display (LCD), a projector, and so on.

One or more watching stations 125 may be located at and/or associated with the content source 110 and/or the content distributor 120. A watching station 125 may receive video and other multimedia content from a content source 110 or a distributor 120, such as a broadcaster, web server, and so on, and include various systems configured to identify content being transmitted, received, and/or broadcast by the content source 110 and/or the content distributor 120. For example, the watching stations 125 may include a reference fingerprint generator that is configured to generate reference fingerprints of received video content and/or a timing system that is configured to measure and/or track a time at which content (e.g., one or more frames of content), is transmitted and/or received, among other things. Thus, in some example embodiments, a watching station 125 associated with the content source 110 or the content distributor 120 may capture reference fingerprints of content and update or store a database or index of reference fingerprints.

The client device 140 may include a query fingerprint generator 145 that is configured to capture and/or generate query fingerprints of a frame or block of frames of video content, such as video content playing at the client device 140.

In some example embodiments, a content insertion system 150 communicates with the watching stations 125 and the client device 140 over the network 130. The content insertion system 150 may include components configured to perform various actions, such as actions to insert content (e.g., advertisements or other sponsored content) and/or replace video content currently being played by the client device 140, such as advertisements within an advertising break within a live broadcast of video content.

For example, the content insertion system 150 may include components configured to identify a location (e.g., one or more frames) within playing video content, and insert supplemental or replacement content at or proximate to the identified location of the video content, among other things. The content insertion system 150 may include or have access to a content database 155 that stores the content to be inserted or used as replacement content.

The fingerprint generator 145 of the client device 140 may determine or calculate fingerprints of frames of playing video content, and the content insertion system 150 may query the databases of the watching stations 125 in order to identify content currently being played at the client device 140. Typically, there is a delay of 3-5 seconds between when content originating at a content source 110 or a content distributor 120 is presented by the client device 140, and thus, the content insertion system 150 may perform queries of reference fingerprint databases to identify playing content and perform content replacements in real-time or near real-time, among other things.

Any of the machines, databases, or devices shown in FIG. 1 may be implemented in a general-purpose computer modified (e.g., configured or programmed) by software to be a special-purpose computer to perform the functions described herein for that machine. For example, a computer system able to implement any one or more of the methodologies described herein is discussed below with respect to FIG. 6. As used herein, a "database" is a data storage resource and may store data structured as a text file, a table, a spreadsheet, a relational database, a triple store, or any suitable combination thereof. Moreover, any two or more of the machines illustrated in FIG. 1 may be combined into a single machine, and the functions described herein for any single machine may be subdivided among multiple machines.

Furthermore, any of the modules, systems, and/or generators may be located at any of the machines, databases, or devices shown in FIG. 1. For example, the content insertion system 150 may include the query fingerprint generator 145, receive frames of video content from the client device 140, and identify the distributor of content based on the received frames of content. As another example, the client device 140 may include and/or incorporate some or all components of the content insertion system 150, among other things.

Examples of Inserting Content into Playing Video Content

Figure 2:
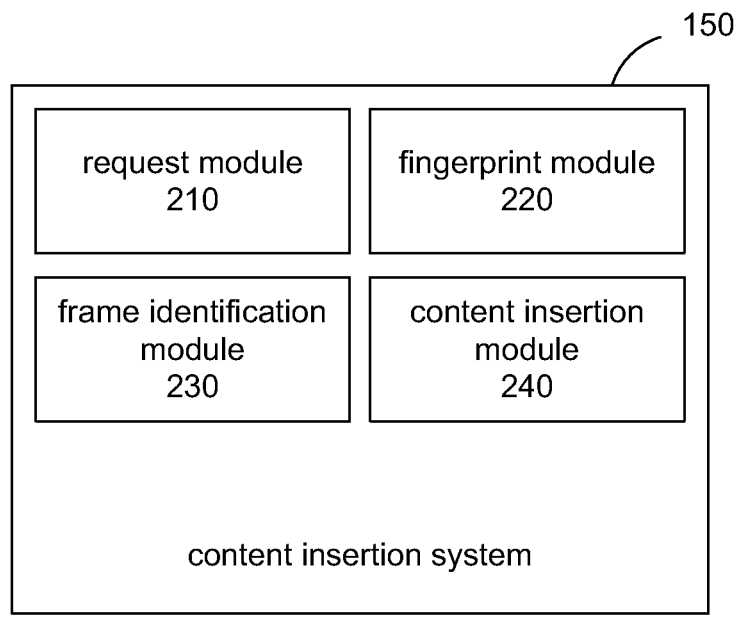
FIG. 2 is a block diagram illustrating components of a content insertion system, according to some example embodiments.

As described herein, in some example embodiments, the systems and methods described herein perform actions to insert replacement content into live broadcasts, such as currently playing streams of video content at the client device 140. FIG. 2 is a block diagram illustrating components of the content insertion system 150, according to some example embodiments. The content insertion system 150 may include various modules and/or components, such as a request module 210, a fingerprint module 220, a frame identification module 230, and a content insertion module 240.

One or more of the modules described herein may be implemented using hardware (e.g., a processor of a machine) or a combination of hardware and software. Moreover, any two or more of these modules may be combined into a single module, and the functions described herein for a single module may be subdivided among multiple modules.

In some example embodiments, the request module 210 is configured and/or programmed to access or receive a request to replace a portion of video content currently playing at a client device with supplemental or replacement video content. For example, the request module 210 may receive a request from a content source 110, such as a broadcaster, that is providing the video content playing at the client device 140 to replace all content within the next advertising break with replacement content, among other things.

The request may be received or accessed via one or more application programming interfaces (APIs) or other communication protocols that facilitate the transmission and reception of instructions between devices, such as instructions that are received and processed by the request module 210 in order to identify portions of video content to be replaced, to identify content to be inserted as supplemental or replacement content, and so on.

In some example embodiments, the fingerprint module 220 is configured and/or programmed to access, determine, and/or calculate one or more fingerprints of video content playing at a client device, such as video content currently playing at the client device 140. For example, the fingerprint module 220 may calculate one or more hash values or other identifiers for one or more frames, or portions thereof, of video content displayed or otherwise presented by the client device 140. The calculated fingerprints may be of an entire frame of content, a portion of a frame of content, multiple frames of content, multiple portions of a frame or frames of content, and so on.

In some example embodiments, the frame identification module 230 is configured and/or programmed to identify one or more frames of the video content at which to insert supplemental or replacement video content based on captured fingerprints. The frame identification module 230 may compare fingerprints of content playing at the client device 140 to fingerprints of content playing at the watching stations 125, such as station 125 at the content source 110 and/or the content distributor 120, and identify and/or determine a frame or frames within the video content as a location at which to insert supplemental or replacement content.

The frame identification module 230 may, in some example embodiments, compare fingerprints of video content playing at the client device 140 to one or more reference fingerprints calculated by a watching station 125 associated with a broadcaster (e.g., content source 110) or multichannel distributor (e.g., content distributor 120) that provides the video content currently playing at the client device 140, and may identify a frame at which to insert supplemental video content based on the comparison. For example, the comparison may identify that the client device 140 will present a frame that is a suitable insertion location in 4 seconds (e.g., 100 frames from now, given a frame rate of 25 ps), which is the time between transmission of the frame from the content source 110 to presentation of the frame at the client device 140.

In some example embodiments, the frame identification module 230 may identify certain characteristics or indicators from a fingerprint that identifies or represents a frame or frames of video content, and identify and/or determine the frame or frames as a location at which to insert supplemental or replacement content.

For example, the frame identification module 230 may identify a frame of the video content that is associated with or represents a black screen inserted into the video content. The identified frame may represent or be part of a block of frames associated with transition frames inserted into the video content between discrete pieces of video content within the video content, among other things. Other characteristics that may be identified include content overlaid onto the video content that indicates the end of a program or advertisement, certain types of content within the video content (e.g., certain credit sequences, certain audio sequences, and so on), and so on.

Thus, in some example embodiments, the frame identification module 230 may identify a frame of video content (e.g, a scene cut) that represents or indicates a change of content within playing video content, or other indicators derived from a frame or signal embedded in a broadcast stream of content (e.g, a MPEG-2 System stream) that may act as implicit or explicit signals to be identified by the frame identification module 230.

In some example embodiments, the frame identification module 230 may periodically or continually monitor a broadcast signal at the client device 140 in order to identify or clues or indications that an incoming signal has changed via user interaction or unexpectedly, among other things. For example, when a user changes a channel or switches to another input source, the frame identification module 230 may identify a location at which to insert content.

Example signals or other device based indicators may include jitter associated with a changed HDMI signal, black or blue screens when a tuner switches to another channel, activity via an IR interface (e.g., IR activity associated with a change of a channel or an attempted change of a channel), muting of playback audio, and so on.

In response to identifying such a signal or indicator, the fingerprint module 220 may automatically or responsively calculate a fingerprint and/or the frame identification module 230 may perform a frame identification, among other things. Additionally, such a signal may cause the content insertion system 150 to stop or adjust playback of replacement content and switch back to an original content source, among other things.

In some example embodiments, the content insertion module 240 is configured and/or programmed to insert the supplemental or replacement video content at the identified one or more frames of the video content. For example, the content insertion module 240 may cause the client device 140 or a component associated with the client device 140 that is presenting the video content (e.g., a set-top box) to insert and display supplemental or replacement content in lieu of currently broadcast content.

The content insertion module 240 may insert supplemental or replacement content at or proximate to an identified frame within playing video content. For example, the content insertion module 240 may insert supplemental video content at least one frame before the identified one or more frames, and may insert content that is at least one frame larger than a replaced portion of video content. Thus, the content insertion module 240 may insert replacement content at one or more frames before a suitable frame, in order to ensure a seamless viewing experience of all of the presented video content, among other things.

The content insertion module 240 may insert content that is cached or pre-cached at the client device 140, or may retrieve the content during a broadcast or replacement, among other things. For example, the content insertion module 240 may store or track a replacement time mark or identifier that is a small time period in advance of the actual replacement time (e.g. several hundred milliseconds), due to timing associated with connecting to a server, preparing content for streaming to the client device 140, decoding, and so on.

In some example embodiments, the content insertion module 240 may select and insert content that is targeted to a user of the client device 140 and/or to a location of the client device 140, among other things. For example, the content insertion module 240 may insert regional content that is associated with the location of the client device 140, content that is associated with demographic information for the user of a client device 140 (e.g., a viewer of the content playing at the client device 140), and so on.

Figure 3:
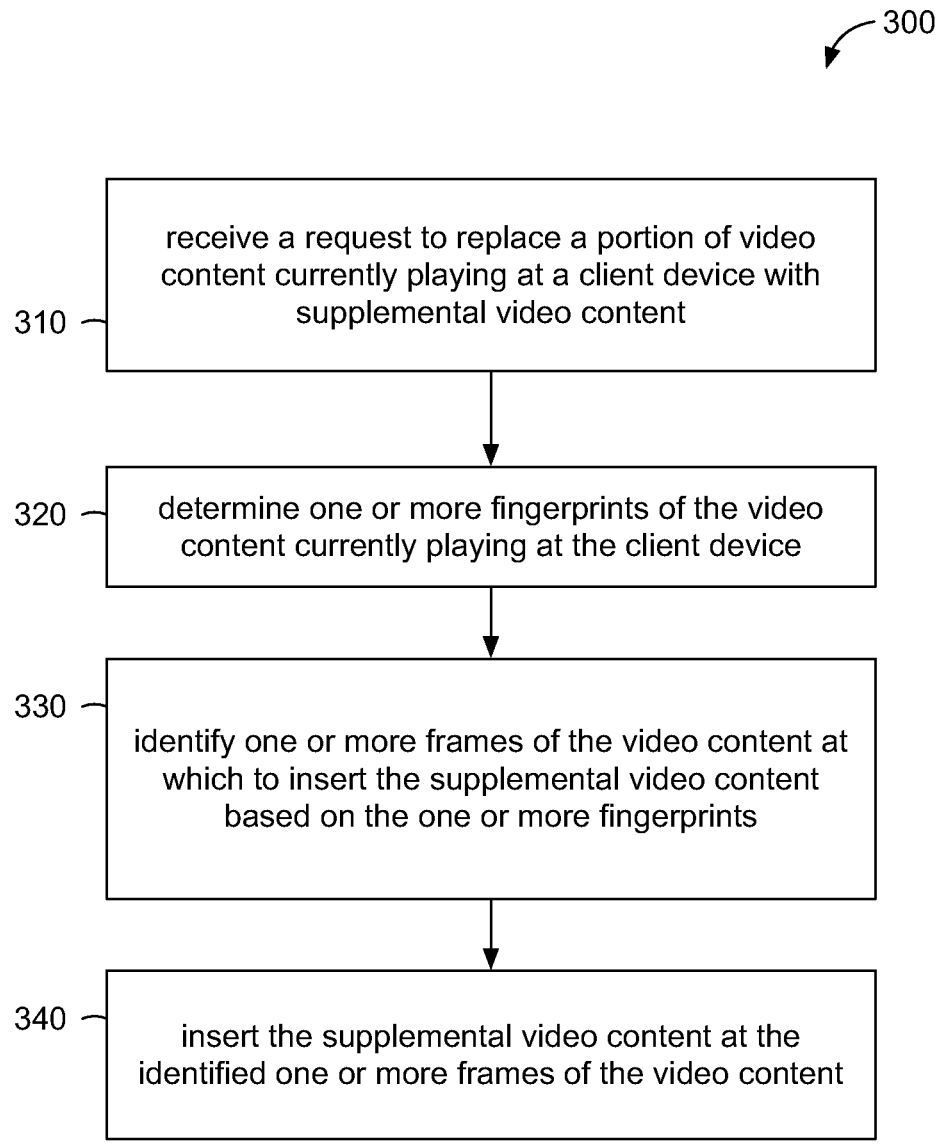
FIG. 3 is a flow diagram illustrating an example method for inserting an advertisement into a stream of video content, according to some example embodiments.

As described herein, the content insertion system 150 may perform various methods in order to select locations within video content at which to insert supplmental or replacement content, among other things. FIG. 3 is a flow diagram illustrating an example method 300 for inserting an advertisement into a stream of video content, according to some example embodiments. The method 300 may be performed by the content insertion system 150 and, accordingly, is described herein merely by way of reference thereto. It will be appreciated that the method 300 may be performed on any suitable hardware.

In operation 310, the content insertion system 150 receives a request to replace a portion of video content currently playing at a client device with supplemental or replacement video content. For example, the request module 210 receives a request from the content source 110 to replace the next presented advertisement with a different advertisement.

In operation 320, the content insertion system 150 determines and/or calculates one or more fingerprints of the video content currently playing at the client device. For example, the fingerprint module 220 determines fingerprints of multiple frames of the video content.

In operation 330, the content insertion system 150 identifies one or more frames of the video content at which to insert the supplemental video content based on the one or more fingerprints. For example, the frame identification module 230 determines that a fingerprint indicates a frame of the video content is associated with a black screen or "fade to black" transition between a first portion of content associated with a program and a second portion of content associated with an advertisement to be presented.

In operation 340, the content insertion system 150 inserts the supplemental video content at the identified one or more frames of the video content. For example, the content insertion module 240 inserts the different advertisement by causing the client device 140 to present the different advertisement in place of the second portion of content, which is not presented.

In some example embodiments, the content insertion module 240 may insert a portion or section of an advertisement, such as a first or second half of an advertisement, among other portions. For example, the content insertion module 240 may replace a second portion of an advertisement with replacement content that is targeted to the location or interests of a viewer.

For example, the content insertion module 240 may consider a first portion of an advertisement as pre-roll time, where the content insertion system 150 may fingerprint and identify the advertisement using the fingerprint, and then identify an exact or well-defined position at which to replace the second portion with replacement content.

Figure 4:
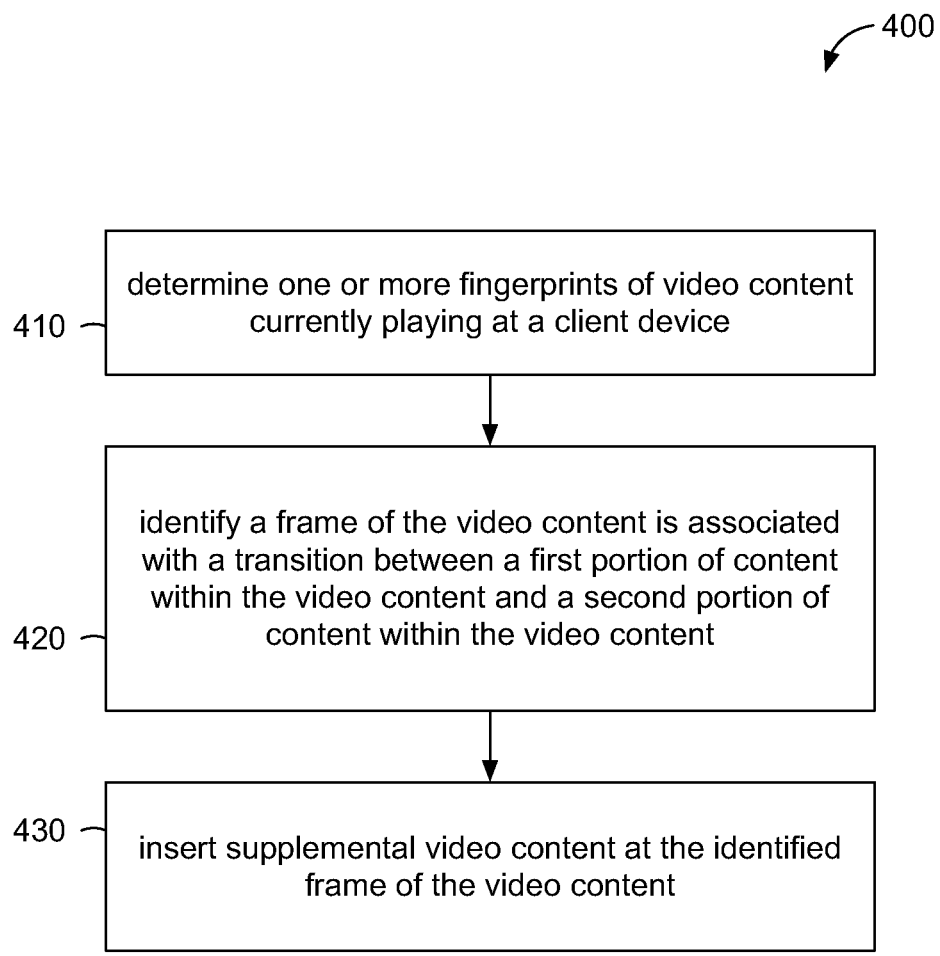
FIG. 4 is a flow diagram illustrating an example method for inserting an advertisement at a specific location of a stream of video content, according to some example embodiments.

As described herein, in some example embodiments, the content insertion system 150 identifies a black screen or other characteristic of playing video content as a suitable location to insert replacement content into playing video content, among other things. FIG. 4 is a flow diagram illustrating an example method 400 for inserting an advertisement at a specific location of a stream of video content, according to some example embodiments. The method 400 may be performed by the content insertion system 150 and, accordingly, is described herein merely by way of reference thereto. It will be appreciated that the method 400 may be performed on any suitable hardware.

In operation 410, the content insertion system 150 determines and/or calculates one or more fingerprints of video content currently playing at a client device, such as client device 140. For example, the fingerprint module 220 calculates fingerprints (e.g., hash values) of frames of playing video content.

In operation 420, the content insertion system 150 identifies a frame of the video content that is associated with a transition between a first portion of content within the video content and a second portion of content within the video content based on the one or more fingerprints. For example, the frame selection module 230 identifies one or more frames that are black screens, monochromatic screens, transition screens, cut screens, and/or a screen that is otherwise absent or contains minimal content.

Figure 5A:
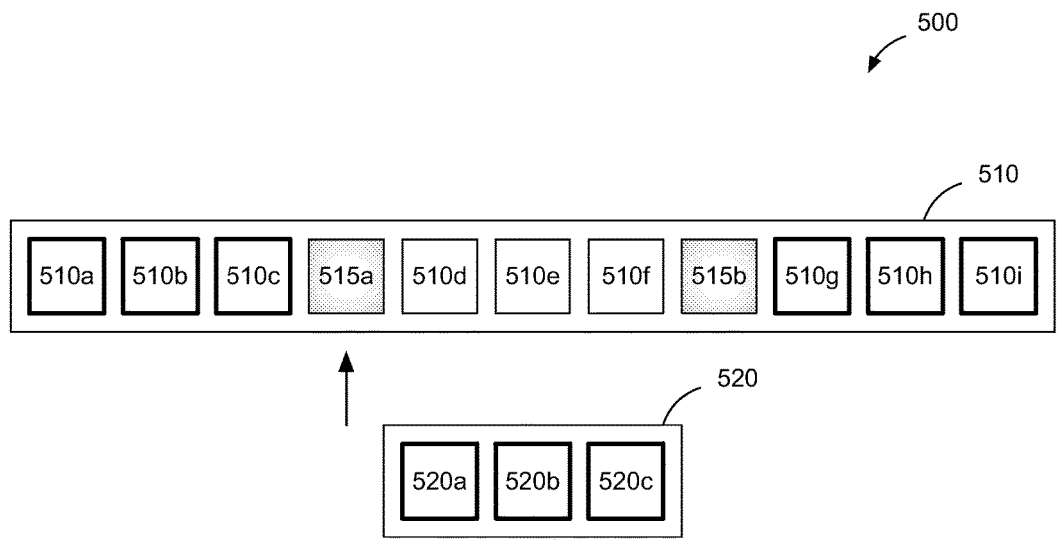
FIGS. 5A-5B are diagrams illustrating example video content replacements, according to some example embodiments.
Figure 5B:
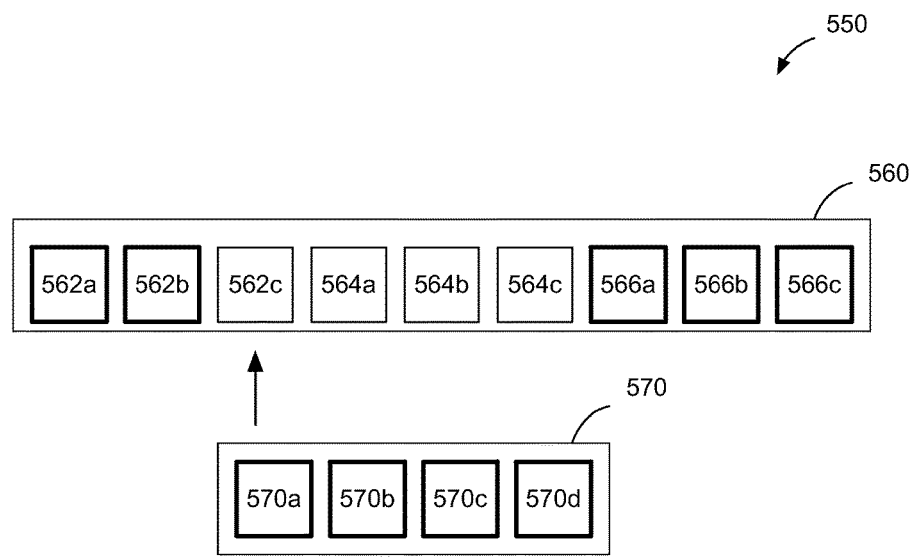

In operation 430, the content insertion system 150 inserts supplemental video content at the identified frame of the video content. For example, the content insertion module 240 inserts replacement content at one or more of the identified frames that are black screens. FIGS. 5A-5B are block diagrams illustration example video content replacements, according to some example embodiments.

For example, FIG. 5A is a block diagram 500 that depicts a content replacement of a stream of video content 510, which includes frames 510a-i, by supplemental content 520, which includes frames 520a-c. The content insertion system 150 identifies frames 515a and 515b that are associated with black screens, and selects the frame 515a as an insertion location for the supplemental content 520. Thus, using the content insertion system 150, the client device 140 plays the content indicated by the highlighted frames, or frames 510a-c, 520a-c, and 510g-i, where frames 520a-c replace frames 510d-f.

As another example, FIG. 5B is a block diagram 550 that depicts a content replacement of an advertisement within an advertising break 560 of video content. The advertising break 560 includes three advertisements, a first advertisement represented by frames 562a-c, a second advertisement represented by frames 564a-c, and a third advertisement represented by frames 566a-c.

The content insertion system 150 identifies frame 564a is associated with the beginning of the second advertisement, and selects the last frame 562c of the first advertisement as an insertion location for a replacement advertisement 570, having frames 570a-d, which is one frame more than the advertisement to be replaced. Thus, using the content insertion system 150, the client device 140 plays the content indicated by the highlighted frames, or frames 562a-b, 570a-d, and 566a-c, where frames 570a-d replace frames 562c and 564a-c.

Thus, in some example embodiments, the methods and systems described herein enable broadcasters and distributors of video content, such as live broadcast television or online programming, to selectively and/or strategically replace the content viewed by users at client devices, without modifying their broad or original content feeds, among other things.

In some example embodiments, the fingerprint generator 145 may determine and/or calculate fingerprints at the content insertion system 150, and cache or otherwise store the fingerprints at the client device 140, among other locations. For example, a server supporting the content insertion system 150 may identify a content source and program source (e.g., a TV show, or a part of a pre-recorded program that has been ingested into the content insertion system 150 hours before broadcast), and the client device 140 downloads a large portion of the fingerprints from the server upon a first successful identification of the content for local verification operations, among other things. The local verification operations may be more robust and granular than performing similar operations at the server, and may be able to verify each and every frame which may enable the content identification system 150 to verify most frames or every frame in order to identify content insertion locations without identifying black or other transition frames, among other things.

As another example, the content insertion system 150 may be supported by a server that is pre-loaded with a specific advertisement. Upon detecting an advertisement at the client device 140, the content insertion system 150 may switch to the server, and identify a content insertion location on a frame by frame basis.

Figure 6:
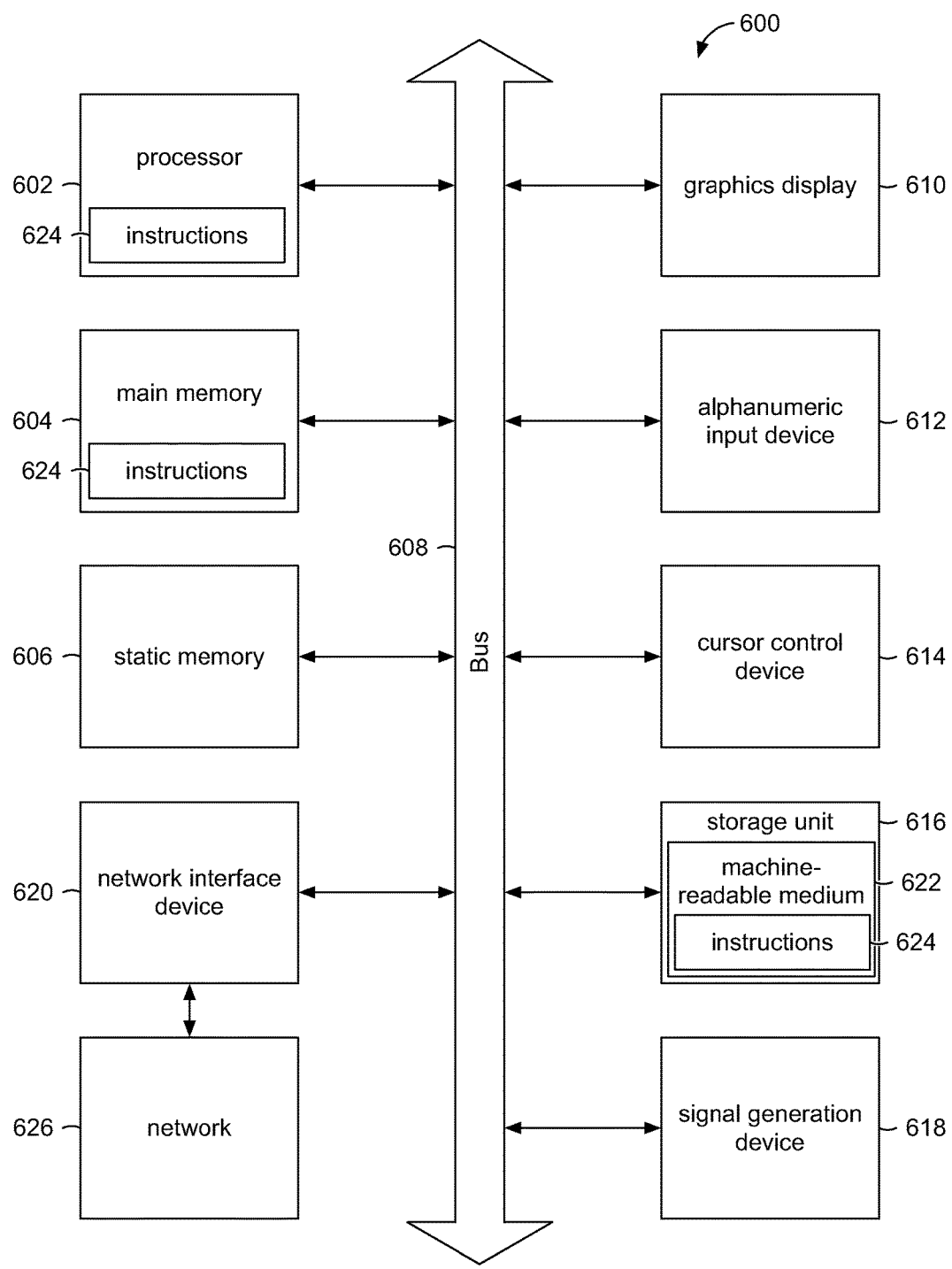
FIG. 6 is a block diagram illustrating components of a machine, according to some example embodiments, able to read instructions from a machine-readable medium and perform any one or more of the methodologies discussed herein.

FIG. 6 is a block diagram illustrating components of a machine 600, according to some example embodiments, able to read instructions from a machine-readable medium (e.g., a machine-readable storage medium) and perform any one or more of the methodologies discussed herein. Specifically, FIG. 6 shows a diagrammatic representation of the machine 600 in the example form of a computer system and within which instructions 624 (e.g., software) for causing the machine 600 to perform any one or more of the methodologies discussed herein may be executed. In alternative embodiments, the machine 600 operates as a standalone device or may be connected (e.g., networked) to other machines. In a networked deployment, the machine 600 may operate in the capacity of a server machine or a client machine in a server-client network environment, or as a peer machine in a peer-to-peer (or distributed) network environment. The machine 600 may be a server computer, a client computer, a personal computer (PC), a tablet computer, a laptop computer, a netbook, an STB, a PDA, a cellular telephone, a smartphone, a web appliance, a network router, a network switch, a network bridge, or any machine capable of executing the instructions 624 (sequentially or otherwise) that specify actions to be taken by that machine. Further, while only a single machine is illustrated, the term "machine" shall also be taken to include a collection of machines that individually or jointly execute the instructions 624 to perform any one or more of the methodologies discussed herein.

The machine 600 includes a processor 602 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 604, and a static memory 606, which are configured to communicate with each other via a bus 608. The machine 600 may further include a graphics display 610 (e.g., a plasma display panel (PDP), an LED display, an LCD, a projector, or a CRT). The machine 600 may also include an alphanumeric input device 612 (e.g., a keyboard), a cursor control device 614 (e.g., a mouse, a touchpad, a trackball, a joystick, a motion sensor, or other pointing instrument), a storage unit 616, a signal generation device 618 (e.g., a speaker), and a network interface device 620.

The storage unit 616 includes a machine-readable medium 622 on which is stored the instructions 624 (e.g., software) embodying any one or more of the methodologies or functions described herein. The instructions 624 may also reside, completely or at least partially, within the main memory 604, within the processor 602 (e.g., within the processor's cache memory), or both, during execution thereof by the machine 600. Accordingly, the main memory 604 and the processor 602 may be considered as machine-readable media. The instructions 624 may be transmitted or received over a network 626 (e.g., network 130 of FIG. 1) via the network interface device 620.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 622 is shown in an example embodiment to be a single medium, the term "machine-readable medium" should be taken to include a single medium or multiple media (e.g., a centralized or distributed database, or associated caches and servers) able to store instructions (e.g., instructions 624). The term "machine-readable medium" shall also be taken to include any medium that is capable of storing instructions (e.g., software) for execution by the machine (e.g., machine 600), such that the instructions, when executed by one or more processors of the machine (e.g., processor 602), cause the machine to perform any one or more of the methodologies described herein. The term "machine-readable medium" shall accordingly be taken to include, but not be limited to, a data repository in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The invention claimed is:

1. A method, comprising:
   determining one or more fingerprints of video content currently playing at a client device;
   by a processor, identifying one or more frames of the video content to be replaced with supplemental video content based on the determined one or more fingerprints, wherein the one or more frames of video content are at least one frame fewer than the supplemental video content; and
   replacing the identified one or more frames of the video content and at least one frame adjacent to the identified one or more frames with the supplemental video content without shifting the at least one frame adjacent to the identified one or more frames,
   wherein the identifying of the one or more frames of the video content to be replaced with the supplemental video content based on the determined one or more fingerprints includes identifying a frame of the video content that is associated with a transition frame inserted into the video content.

2. The method of claim 1, wherein the transition frame is associated with a black screen inserted into the video content.

3. The method of claim 1, wherein the identifying of the one or more frames of the video content to be replaced with the supplemental video content based on the determined one or more fingerprints includes identifying two or more frames of the video content that are associated with transition frames inserted into the video content between discrete pieces of video content within the video content.

4. The method of claim 1, wherein the identifying of the one or more frames of the video content to be replaced with the supplemental video content based on the determined one or more fingerprints includes:
   comparing the determined one or more fingerprints of the video content to one or more reference fingerprints captured at a broadcaster that provides the video content currently playing at the client device; and
   identifying the one or more frames to be replaced with the supplemental video content based on a result of the comparison.

5. The method of claim 1, wherein the replacing of the identified one or more frames of the video content and at least one frame adjacent to the identified one or more frames replaces at least one frame before the identified one or more frames.

6. The method of claim 1, wherein:
   the one or more frames of video content comprise an advertisement of an advertising break within the video content currently playing at the client device; and the replacing of the identified one or more frames of the video content and the at least one frame adjacent to the identified one or more frames includes replacing the advertisement with an advertisement that is targeted to a user associated with the client device.

7. The method of claim 1, wherein:
the one or more frames of video content comprise an advertisement of an advertising break within the video content currently playing at the client device; and
the replacing of the identified one or more frames of the video content and the at least one frame adjacent to the identified one or more frames includes replacing the advertisement with an advertisement that is targeted to a location associated with the client device.

8. The method of claim 1, wherein:
the identified one or more frames of video content are frames of a first advertisement;
the at least one frame adjacent to the identified one or more frames is at least one frame of a second advertisement; and
the supplemental video content is a third advertisement.

9. A system, comprising:
a memory storing instructions; and
one or more processors configured by the instructions to perform operations comprising:
  determining one or more fingerprints of video content currently playing at a client device;
  identifying one or more frames of the video content to be replaced with supplemental video content based on the determined one or more fingerprints, wherein the one or more frames of video content are at least one frame fewer than the supplemental video content; and
  replacing the identified one or more frames of the video content and at least one frame adjacent to the identified one or more frames with the supplemental video content without shifting the at least one frame adjacent to the identified one or more frames,
  wherein the identifying of the one or more frames of the video content to be replaced with the supplemental video content based on the determined one or more fingerprints includes identifying a frame of the video content that is associated with a transition frame within the video content.

10. The system of claim 9, wherein, to identify the frame of the video content that is associated with the transition frame within the video content, the operations further comprise identifying a frame of the video content that is associated with a black screen within the video content.

11. The system of claim 9, wherein the operations further comprise identifying two or more frames of the video content that are associated with transition frames inserted into the video content between discrete pieces of video content within the video content.

12. The system of claim 9, wherein the operations further comprise:
  comparing the determined one or more fingerprints of the video content to one or more reference fingerprints determined at a broadcaster that provides the video content currently playing at the client device; and
  identifying the one or more frames to be replaced with the supplemental video content based on a result of the comparison.

13. The system of claim 9, wherein the replacing of the identified one or more frames of the video content and at least one frame adjacent to the identified one or more frames replaces at least one frame before the identified one or more frames.

14. The system of claim 9, wherein:
the identified one or more frames of video content are frames of a first advertisement;
the at least one frame adjacent to the identified one or more frames is at least one frame of a second advertisement; and
the supplemental video content is a third advertisement.

15. The system of claim 9, wherein:
the one or more frames of video content comprise an advertisement of an advertising break within the video content currently playing at the client device; and
the replacing of the identified one or more frames of the video content and the at least one frame adjacent to the identified one or more frames includes replacing the advertisement with an advertisement that is targeted to a user associated with the client device.

16. The system of claim 9, wherein:
the one or more frames of video content comprise an advertisement of an advertising break within the video content currently playing at the client device; and
the replacing of the identified one or more frames of the video content and the at least one frame adjacent to the identified one or more frames includes replacing the advertisement with an advertisement that is targeted to a location associated with the client device.

17. The system of claim 9, wherein:
the one or more frames of video content requested to be replaced are one or more frames of a first portion of an advertisement; and
the replacing of the identified one or more frames of the video content and the at least one frame adjacent to the identified one or more frames includes replacing the first portion of the advertisement with a second portion of the advertisement, the second portion being targeted to a location associated with the client device.

18. A non-transitory computer-readable storage medium whose contents, when executed by a computing system, cause the computing system to perform operations, comprising:
  calculating one or more fingerprints of video content currently playing at a client device;
  identifying one or more frames of the video content to be replaced with supplemental video content based on the calculated one or more fingerprints, wherein the one or more frames of video content are at least one frame fewer than the supplemental video content; and
  replacing the identified one or more frames of the video content and at least one frame adjacent to the identified one or more frames with the supplemental video content without shifting the at least one frame adjacent to the identified one or more frames,
  wherein the identifying of the one or more frames of the video content to be replaced with the supplemental video content based on the determined one or more fingerprints includes identifying a frame of the video content that is associated with a transition frame inserted into the video content.

19. The non-transitory computer-readable storage medium of claim 18, wherein:
the identified one or more frames of video content are frames of a first advertisement;
the at least one frame adjacent to the identified one or more frames is at least one frame of a second advertisement; and
the supplemental video content is a third advertisement.

20. The non-transitory computer-readable storage medium of claim 18, wherein:
- the one or more frames of video content comprise an advertisement of an advertising break within the video content currently playing at the client device; and
- the replacing of the identified one or more frames of the video content and the at least one frame adjacent to the identified one or more frames includes replacing the advertisement with an advertisement that is targeted to a user associated with the client device.

* * * * *